United States Patent
Dumble

(10) Patent No.: US 11,167,743 B2
(45) Date of Patent: Nov. 9, 2021

(54) AUTOMATIC PITCH MOUNTING COMPENSATION IN AN AUTOMATIC STEERING SYSTEM

(71) Applicant: AGJUNCTION LLC, Hiawatha, KS (US)

(72) Inventor: Steven J. Dumble, Brisbane (AU)

(73) Assignee: AGJUNCTION, LLC, Scottsdale, AZ (US)

( * ) Notice: Subject to any disclaimer, the term of this patent is extended or adjusted under 35 U.S.C. 154(b) by 113 days.

(21) Appl. No.: 16/355,355

(22) Filed: Mar. 15, 2019

(65) Prior Publication Data

US 2019/0299966 A1 Oct. 3, 2019

Related U.S. Application Data

(60) Provisional application No. 62/652,239, filed on Apr. 3, 2018.

(51) Int. Cl.
| | |
|---|---|
| *B60W 10/22* | (2006.01) |
| *G05D 1/02* | (2020.01) |

(Continued)

(52) U.S. Cl.
CPC .......... *B60W 10/22* (2013.01); *G01C 25/005* (2013.01); *G05D 1/027* (2013.01); *A01B 69/008* (2013.01);

(Continued)

(58) Field of Classification Search
CPC ............... A01B 69/008; B60W 10/22; B60W 2300/152; B60W 2420/905;

(Continued)

(56) References Cited

U.S. PATENT DOCUMENTS

| | | |
|---|---|---|
| 5,194,851 A | 3/1993 | Kraning et al. |
| 5,390,125 A | 2/1995 | Sennott et al. |

(Continued)

OTHER PUBLICATIONS

Noh, Kwang-Mo, Self-tuning controller for farm tractor guidance, Iowa State University Retrospective Theses and Dissertations, Paper 9874, (1990), 25 Pages.

(Continued)

*Primary Examiner* — Behrang Badii
*Assistant Examiner* — Daniel L Greene
(74) *Attorney, Agent, or Firm* — Schwabe Williamson & Wyatt

(57) ABSTRACT

A calibration system calibrates inertial sensor readings on a vehicle. The calibration system estimates an attitude of the ground from a series of height and position measurements and reads an attitude from an inertial sensor subsystem attached to the vehicle. The calibration system then calculates an attitude offset between the vehicle and inertial sensor subsystem based on a difference between the estimated attitude of the ground and the attitude reading of the inertial sensor subsystem. The calibration system may estimate a slope of the ground from a 3-dimensional terrain map. The slope of the ground is converted into an estimated roll and/or pitch of the vehicle which is then compared with the roll and pitch readings from the inertial sensor subsystem to determine the attitude offset.

18 Claims, 10 Drawing Sheets

(51) Int. Cl.
*G01C 25/00* (2006.01)
*A01B 69/04* (2006.01)

(52) U.S. Cl.
CPC . *B60W 2300/152* (2013.01); *B60W 2420/905* (2013.01); *B60W 2520/14* (2013.01); *B60W 2520/16* (2013.01); *B60W 2520/18* (2013.01); *B60W 2555/40* (2020.02); *B60W 2556/60* (2020.02); *G05D 2201/0201* (2013.01)

(58) Field of Classification Search
CPC ......... B60W 2520/14; B60W 2520/16; B60W 2520/18; B60W 2555/40; B60W 2556/60; G01C 25/005; G05D 1/027; G05D 2201/0201
See application file for complete search history.

(56) References Cited

U.S. PATENT DOCUMENTS

| | | | |
|---|---|---|---|
| 5,663,879 A | 9/1997 | Trovato et al. | |
| 5,923,270 A | 7/1999 | Sampo et al. | |
| 6,052,647 A | 4/2000 | Parkinson et al. | |
| 6,070,673 A | 6/2000 | Wendte | |
| 6,212,453 B1 | 4/2001 | Kawagoe et al. | |
| 6,373,432 B1 | 4/2002 | Rabinowitz et al. | |
| 6,377,889 B1 | 4/2002 | Soest | |
| 6,445,983 B1 | 9/2002 | Dickson et al. | |
| 6,539,303 B2 | 3/2003 | McClure et al. | |
| 6,711,501 B2 | 3/2004 | McClure et al. | |
| 6,789,014 B1 | 9/2004 | Rekow et al. | |
| 6,819,780 B2 | 11/2004 | Benson et al. | |
| 6,865,465 B2 | 3/2005 | McClure | |
| 6,876,920 B1 | 4/2005 | Mailer | |
| 7,142,956 B2 | 11/2006 | Heiniger et al. | |
| 7,162,348 B2 | 1/2007 | McClure et al. | |
| 7,277,792 B2 | 10/2007 | Overschie | |
| 7,373,231 B2 | 5/2008 | McClure et al. | |
| 7,400,956 B1 | 7/2008 | Feller et al. | |
| 7,437,230 B2 | 10/2008 | McClure | |
| 7,460,942 B2 | 12/2008 | Mailer | |
| 7,689,354 B2 | 3/2010 | Heiniger et al. | |
| RE41,358 E | 5/2010 | Heiniger et al. | |
| 7,835,832 B2 * | 11/2010 | Macdonald | A01B 79/005 701/24 |
| 7,885,745 B2 | 2/2011 | McClure et al. | |
| 8,018,376 B2 | 9/2011 | McClure et al. | |
| 8,190,337 B2 | 5/2012 | McClure | |
| 8,214,111 B2 | 7/2012 | Heiniger et al. | |
| 8,311,696 B2 | 11/2012 | Reeve | |
| 8,386,129 B2 | 2/2013 | Collins et al. | |
| 8,401,704 B2 | 3/2013 | Pollock et al. | |
| 8,489,291 B2 | 7/2013 | Dearborn et al. | |
| 8,521,372 B2 | 8/2013 | Hunt et al. | |
| 8,548,649 B2 | 10/2013 | Guyette et al. | |
| 8,583,315 B2 | 11/2013 | Whitehead et al. | |
| 8,583,326 B2 | 11/2013 | Collins et al. | |
| 8,589,013 B2 | 11/2013 | Pieper et al. | |
| 8,594,879 B2 | 11/2013 | Roberge et al. | |
| 8,634,993 B2 * | 1/2014 | McClure | G01C 15/00 701/50 |
| 8,639,416 B2 | 1/2014 | Jones et al. | |
| 8,649,930 B2 | 2/2014 | Reeve et al. | |
| 8,676,620 B2 | 3/2014 | Hunt et al. | |
| 8,718,874 B2 | 5/2014 | McClure et al. | |
| 8,768,558 B2 | 7/2014 | Reeve et al. | |
| 8,781,685 B2 | 7/2014 | McClure | |
| 8,803,735 B2 | 8/2014 | McClure | |
| 8,897,973 B2 | 11/2014 | Hunt et al. | |
| 8,924,152 B2 | 12/2014 | Hunt et al. | |
| 9,002,565 B2 | 4/2015 | Jones et al. | |
| 9,002,566 B2 | 4/2015 | McClure et al. | |
| 9,141,111 B2 | 9/2015 | Webber et al. | |
| 9,162,703 B2 | 10/2015 | Miller et al. | |
| 9,173,337 B2 | 11/2015 | Guyette et al. | |
| 9,223,314 B2 | 12/2015 | McClure et al. | |
| 9,255,992 B2 | 2/2016 | McClure | |
| 9,389,615 B2 | 7/2016 | Webber et al. | |
| 9,703,290 B1 * | 7/2017 | Vandapel | G05D 1/0248 |
| 9,731,744 B2 * | 8/2017 | Carter | G06Q 10/00 |
| 9,791,279 B1 * | 10/2017 | Somieski | G01C 9/00 |
| 10,232,869 B2 * | 3/2019 | Carter | G08B 13/1436 |
| 10,255,670 B1 * | 4/2019 | Wu | H04N 7/183 |
| 2002/0072850 A1 | 6/2002 | McClure et al. | |
| 2004/0186644 A1 | 9/2004 | McClure et al. | |
| 2006/0167600 A1 | 7/2006 | Nelson, Jr. et al. | |
| 2006/0208169 A1 * | 9/2006 | Breed | G06K 9/00624 250/221 |
| 2007/0250261 A1 * | 10/2007 | Soehren | G01C 21/16 701/510 |
| 2008/0039991 A1 * | 2/2008 | May | G05D 1/0278 701/25 |
| 2010/0274452 A1 | 10/2010 | Ringwald et al. | |
| 2011/0022267 A1 * | 1/2011 | Murphy | B60W 30/04 701/38 |
| 2013/0041549 A1 * | 2/2013 | Reeve | G05D 1/0278 701/28 |
| 2013/0046439 A1 * | 2/2013 | Anderson | B60C 23/002 701/36 |
| 2013/0332105 A1 * | 12/2013 | McKown | G01P 21/00 702/141 |
| 2014/0266877 A1 | 9/2014 | McClure | |
| 2014/0277676 A1 | 9/2014 | Gattis | |
| 2014/0336970 A1 * | 11/2014 | Troni-Peralta | G01C 17/38 702/96 |
| 2015/0175194 A1 | 6/2015 | Gattis | |
| 2016/0039454 A1 | 2/2016 | Mortimer | |
| 2016/0147225 A1 * | 5/2016 | Sights | G05D 1/0278 701/23 |
| 2016/0154108 A1 | 6/2016 | McClure et al. | |
| 2016/0205864 A1 | 7/2016 | Gattis et al. | |
| 2016/0214643 A1 | 7/2016 | Joughin et al. | |
| 2016/0216116 A1 * | 7/2016 | Kourogi | G01C 22/006 |
| 2016/0252909 A1 | 9/2016 | Webber et al. | |
| 2016/0334804 A1 | 11/2016 | Webber et al. | |
| 2016/0364678 A1 * | 12/2016 | Cao | G06Q 50/30 |
| 2016/0364679 A1 * | 12/2016 | Cao | G06Q 50/30 |
| 2017/0356757 A1 * | 12/2017 | Bourret | G01C 23/005 |
| 2019/0128673 A1 * | 5/2019 | Faragher | G01C 21/005 |
| 2019/0361457 A1 * | 11/2019 | Johnson | B63H 25/00 |

OTHER PUBLICATIONS

Van Zuydam,. R.P., Centimeter-Precision Guidance of Agricultural Implements in the Open Field by Means of Real Tim Kinematic DGPS, ASA-CSSA-SSSA, pp. 1023-1034 (1999).

PCT, International Search Report and Written Opinion of the International Searching Authority for International Application No. PCT/US2019/022743, dated Sep. 10, 2019, pp. 12.

Vinande E et al.: "Mounting-Angle Estimation for Personal Navigation Devices",IEEE Transactions on Vehicular Technology, IEEE Service Center, Piscataway, NJ, US,vol. 59, No. 3, Mar. 1, 2010 (Mar. 1, 2010), pp. 1129-1138, XP011296528,ISSN: 0018-9545.

USPTO, International Preliminary Report on Patentability for International Application No. PCT/US2019/022743, dated Oct. 15, 2020, pp. 11.

* cited by examiner

General Tractor Layout

Terrain Compensation

GNSS Altitude History follows Terrain Profile

AUTOMATIC PITCH MOUNTING COMPENSATION IN AN AUTOMATIC STEERING SYSTEM

The present application claims priority to U.S. Provisional Patent Application Ser. No. 62/652,239 filed on Apr. 3, 2018, entitled: METHOD FOR AUTOMATIC PITCH MOUNTING COMPENSATION IN AN AUTOMATIC STEERING SYSTEM which is incorporated by reference in its entirety.

TECHNICAL FIELD

The present invention relates generally to auto-steering systems based on Global Navigation Satellite System (GNSS) navigation, and in particular automatically calibrating the auto-steering system for accurate control.

BACKGROUND

Current automated agricultural vehicle guidance and steering systems use a combination of GNSS receivers and inertial sensors mounted on the vehicle to automatically steer a specific reference point (i.e. control point) on the vehicle. In one example, vehicle guidance system steers a control point located at the center of a vehicle rear axle along a desired path projected onto the ground.

Guidance systems need accurate ground position information. However, the guidance system measures the GNSS receiver antenna position not the vehicle control point. Therefore, the guidance system needs an accurate way to project the measured GNSS position down to the ground control point. This is commonly referred to as terrain compensation. This projection can be estimated from the inertial sensors or from a fusion process of the inertial sensors and GNSS receiver. Part of the projection process requires knowledge of the mounting orientation of the inertial sensors relative to the vehicle body. The process of measuring or estimating the inertial sensor offsets relative to the vehicle is commonly part of the inertial sensor calibration process.

The inertial sensor offsets are assumed to be fixed (or constant) and are typically measured once at the time of installation. The inertial sensors are typically part of the steering control unit which is installed at some fixed location on the vehicle.

If the mounting orientation of the steering control unit and the included inertial sensors change, the new mounting offsets would need to be updated. Otherwise the GNSS projection process produces erroneous projections. Thus, changing the steering control unit orientation typically requires re-running the calibration process.

There are various approaches to measuring the mounting offsets of the inertial sensors (typically referred to as roll and pitch biases). One calibration method records the estimated attitude measurements from the inertial sensors while stationary or traveling straight in one direction and then repeats the same process but facing 180 degrees in the other direction over the same section of the terrain. Comparing these two sets of readings allows the attitude component due to the terrain to be eliminated, leaving only the attitude component due to the mounting offsets (i.e. the roll and pitch bias). This calibration process carries out a distinct series of vehicle operational steps to identify the mounting biases. This means that the biases cannot be estimated during typical operation, and a separate dedicated process needs to be carried out.

Some automatic steering systems combine the steering actuator and controller, including the inertial sensor subsystem, in a single unit which is directly mounted to the steering wheel or column. In some vehicles, the steering column rake angle can be adjusted. It may not be desirable to have to manually re-run the calibration process in these vehicles every time the steering column rake angle is adjusted.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

A steering control system automatically estimates and compensates for a relative attitude offset between a vehicle chassis or body and a steering system inertial sensor subsystem. The steering system automatically re-calibrates the mounting offsets during normal vehicle operation without user intervention. This is particularly useful with steering control units mounted on steering wheels or columns, where a user can freely adjust the steering column rake angle on the fly.

Figure 1:
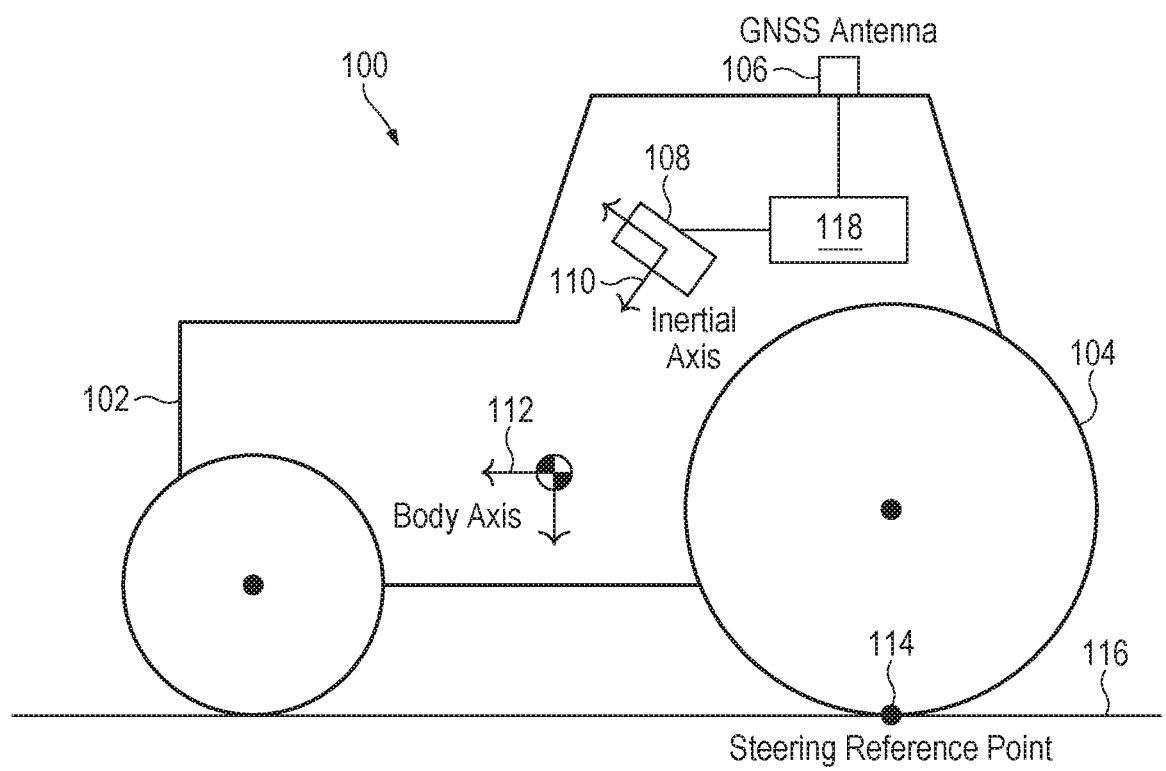
FIG. 1 depicts a typical auto-steering system.

FIG. 1 shows an example auto-steering system 100 located on a vehicle 102, such as a tractor. A GNSS receiver and antenna subsystem 106 are mounted at some location on vehicle 102, such as on the top of the vehicle cab. The location of GNSS 106 is typically not at the steering control point 114, which is typically the point on vehicle 102 that is controlled along a desired path. In one example, steering control point 114 may be at the center line of a rear axle where rear wheels 104 contact ground surface 116.

An inertial sensor subsystem 108 may include any combination of gyroscopes and accelerometers that are usually mounted at a second location on vehicle 102 different from the first location of GNSS subsystem 106. Inertial sensor subsystem 108 is typically mounted to vehicle 102 with an unknown and/or variable pitch mounting offset relative to the orientation of vehicle 102.

A steering control unit 118 may include one or more processors coupled to both GNSS subsystem 106 and inertial subsystem 108. Steering control unit 118 uses position data received from GNSS subsystem 106 and attitude data received from inertial sensor subsystem 108 to steer reference point 114 on vehicle 102 along a desired path over ground surface 116. In one embodiment, inertial sensor subsystem 108 is located in steering control unit 118 and mounted to vehicle 102 at a fixed position and orientation. In another embodiment, inertial sensor subsystem 108 is located in steering control unit 108 and mounted to a steering column of vehicle 102 which has an adjustable rake angle.

Control unit 118 needs to know the attitude of vehicle body axis 112 in order to accurately project the GNSS position measured by GNSS subsystem 106 down to reference point 114. In order to accurately project the position of GNSS subsystem 106 down to control point 114, control unit 118 calculates the attitude mounting offset between inertial axis 110 of inertial sensor subsystem 108 and vehicle body axis 112 of vehicle 102.

Figure 2:
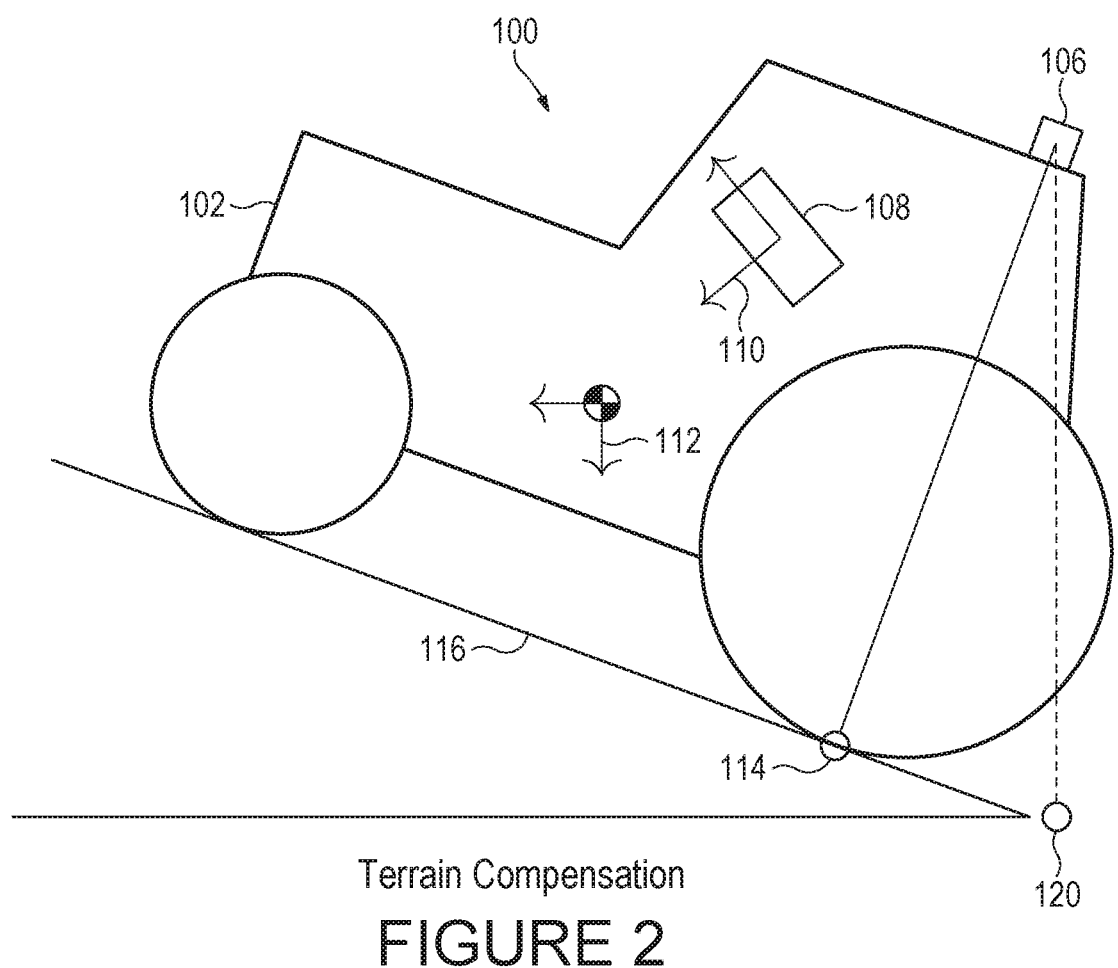
FIG. 2 depicts an example terrain compensation system that compensates a GNSS position when the ground is not flat and level.

FIG. 2 shows in more detail the need to accurately determine the attitude mounting offset of inertial sensor subsystem 108. When vehicle 102 is pitched or rolled due to a sloping terrain 116, the position of GNSS subsystem 106 needs to be projected at a non-vertical angle down to steering control point 114. Otherwise it can only be assumed to be projected vertically downwards to location 120 creating an unacceptable position error for accurate steering and control. Control unit 118 needs to discover the attitude mounting offset between inertial sensor axis 110 and body axis 112, otherwise the estimated attitude 112 of vehicle 102 used for terrain compensation will be incorrect.

Control unit 118 automatically calibrates inertial sensor subsystem 108 for inertial sensor mounting attitude offsets without an operator having to manually measure or manually run specific calibration steps. Control unit 118 estimates the inertial mounting offset of inertial sensor subsystem 108 any time its position or orientation is changed, such as during vehicle use or at time of installation.

Figure 3:
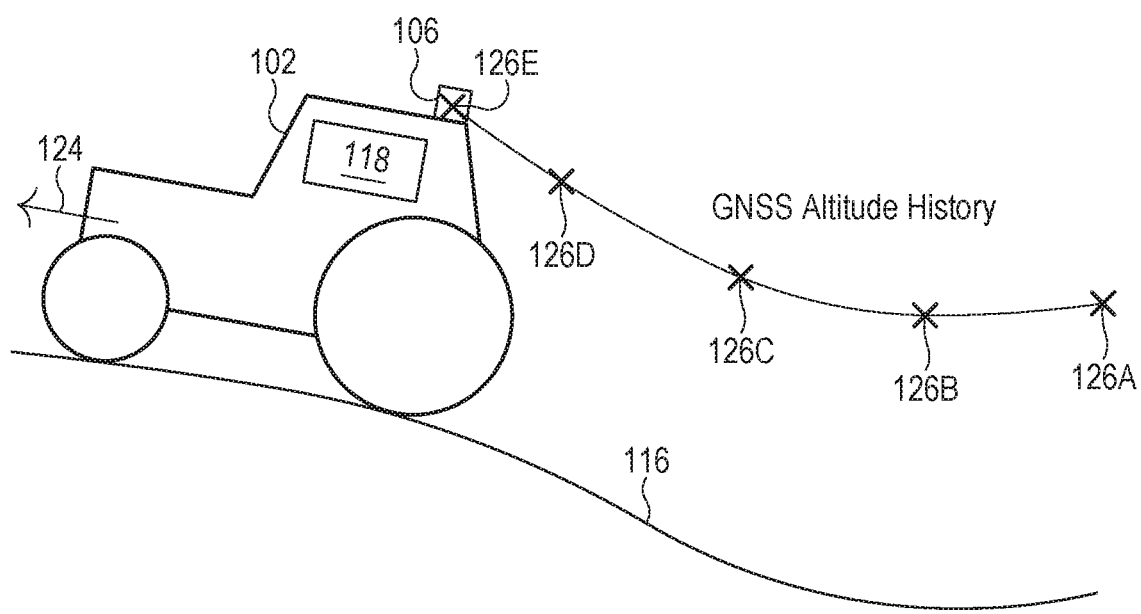
FIG. 3 depicts an example diagram showing how the GNSS position and altitude histories can be used to estimate the shape of the terrain.
Figure 4:
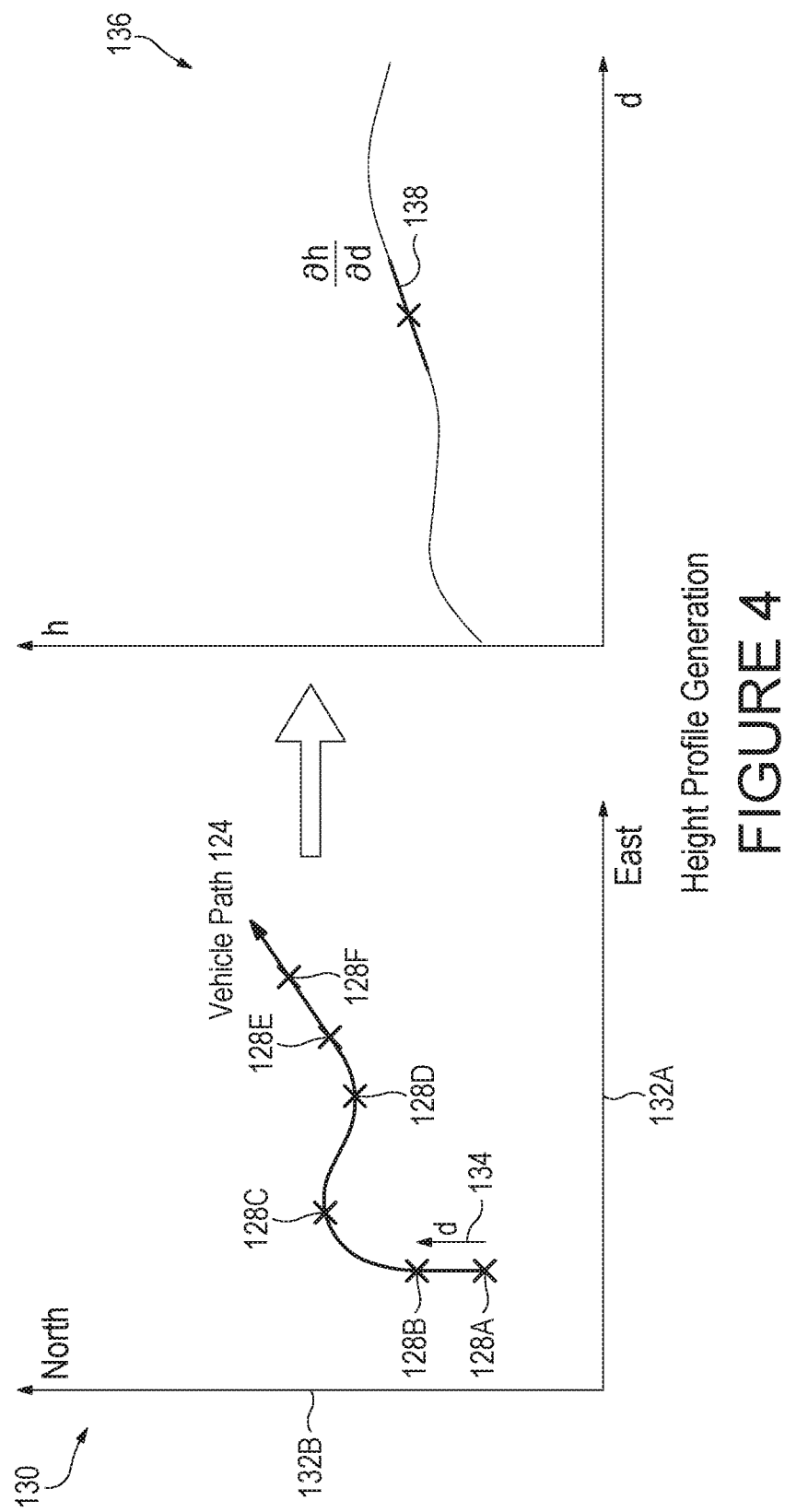
FIG. 4 depicts an example process for turning GNSS position measurements into a 1-Dimension height profile which can be used to estimate ground pitch.

FIGS. 3 and 4 show in more detail how control unit 118 generates a three dimensional map alternatively referred to as a terrain map or terrain profile. Referring first to FIG. 3, control unit 118 measures and stores different altitudes 126A-126E from data supplied by GNSS subsystem 106 while vehicle 102 travels along a path 124. The different altitude measurements 126 correspond to changes in the altitude of terrain 116.

Referring now to FIG. 4, a first map 130 includes an x-axis that corresponds to a measured eastern or longitudinal position 132A of vehicle 102 and the y-axis corresponds to a measured northern or latitudinal position 132B of vehicle 102. Control unit 118 uses GNSS subsystem 106 to measure altitudes 128A-128F and associated positions 132 as the same points in time. Curve 130 provides a three dimensional mapping of height, x-position, and y-position.

Second map 136 includes an x-axis that corresponds to distance (d) and a y-axis that corresponds to height or altitude (h). Control unit 118 generates a one-dimensional terrain profile 136 by calculating distances 134 between the locations of each altitude measurement 128. Control unit 118 measures the slope of curve 138 by calculating changes in height 128 vs. changes in associated distances 134. Control unit 118 uses the slope of curve 138 to estimate the attitude of vehicle 102.

Figure 5:
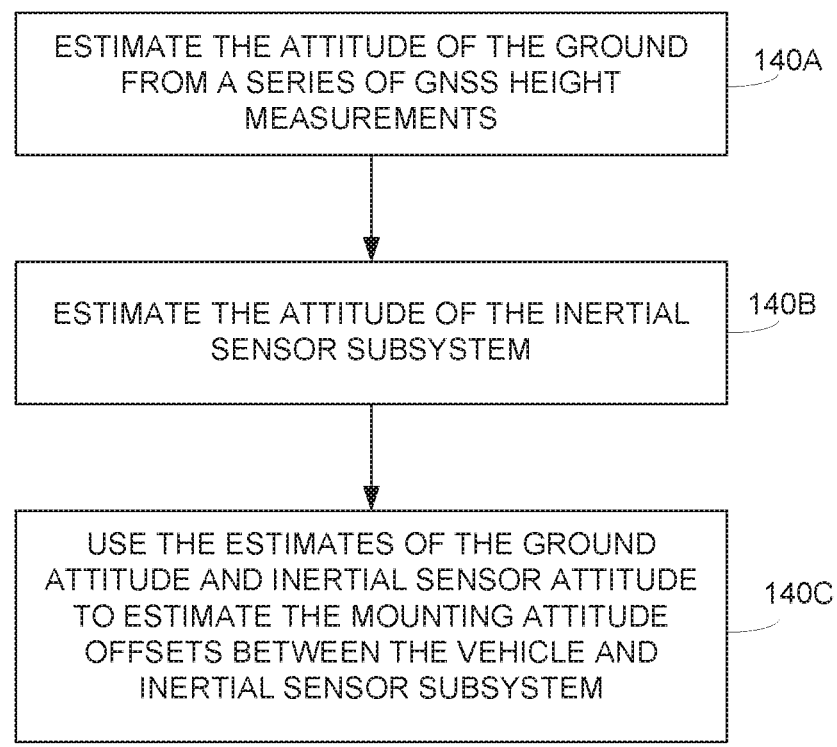
FIG. 5 depicts an example process for estimating mounting attitude offsets between a vehicle and an inertial sensor subsystem.

FIG. 5 shows one example process auto-steering system 100 uses for calibrating inertial sensor subsystem 108. In operation 140A, control unit 118 estimates the attitude of the ground from a series of GNSS height measurements as shown above in FIGS. 3 and 4. In operation 140B, control unit 118 estimates an attitude of inertial sensor subsystem 108. For example, inertial sensor subsystem 108 may provide yaw, roll, and pitch measurements. In operation 140C, control unit 118 uses the estimates of the ground attitude and inertial sensor attitude to estimate the mounting attitude offsets between body axis 112 of vehicle 102 and inertial axis 110 of inertial sensor subsystem 108.

Control unit 118 uses the slope of curve 138 in FIG. 4 to estimate the roll and pitch attitude of ground surface 116 along path 124 of vehicle 102. In operation 140C, auto-steering system 108 may estimate the roll and pitch bias mounting angles of inertial sensor subsystem 108 or may only estimate the pitch bias mounting angle of inertial sensor subsystem 108 and assume that the roll bias stays the same.

Control unit 118 in operation 140A uses the GNSS positional measurements to generate the height map of the local terrain as shown above in FIGS. 3 and 4. Let the terrain height map be:

$$h_i = h(x_i, y_i),$$

where $h_i$ is the height at the position coordinates $(x_i, y_i)$ and $h(\bullet, \bullet)$ of the terrain model. There are numerous methods known to those skilled in the art for estimating the terrain model $h(\bullet, \bullet)$ from a dataset of GNSS measurements. It is assumed that an appropriate method has been used and that the terrain model is available for the rest of the process.

The partial derivative of the height map $$\left( \frac{\partial h^n}{\partial x}, \frac{\partial h^n}{\partial y} \right)$$

is then evaluated and transformed to be aligned with the vehicle heading. The ground slopes aligned with the vehicle are converted into roll $\phi_g$ and pitch $\theta_g$ angles of the ground using:

$$\phi_g = \arctan\left( \cos(\psi)\left(\frac{\partial h^n}{\partial x}\right) + \sin(\psi)\left(\frac{\partial h^n}{\partial y}\right) \right)$$

$$\theta_g = \arctan\left( -\sin(\psi)\left(\frac{\partial h^n}{\partial x}\right) + \cos(\psi)\left(\frac{\partial h^n}{\partial y}\right) \right)$$

where $$\left( \frac{\partial h^n}{\partial x}, \frac{\partial h^n}{\partial y} \right)$$

are the partial derivative of the height map calculated or estimated around the current vehicle location and $\psi$ is the vehicle body heading.

Operation 140B uses the inertial sensors, or a fusion process of the inertial sensors and other sensors, to estimate the attitude of the inertial sensor subsystem 108 ($\phi_h$, $\theta_h$) or of vehicle 102 ($\phi$, $\theta$) if the inertial mounting biases ($\phi_b$, $\theta_b$) are assumed to be known.

Operation 140C detects the mounting biases, and determines how the mounting biases need to be changed if the current mounting biases are wrong. This depends on whether or not the attitude of inertial sensor subsystem 108 is used in operation 140B or if the estimated vehicle attitude (corrected with a set of mounting biases) is used.

In either case, control unit 118 may low pass filter the difference between the estimated attitude and the ground attitude to measure the mean and remove any transient effects. If this mean value is significantly different from current mounting biases, the mounting biases can be updated to this new mean value. In the case when the vehicle attitude is used, when the mean shifts significantly from zero, the current mounting biases of inertial sensor subsystem 108 can be incremented by the mean.

The general method may generate a fairly accurate terrain map so that the roll bias can be accurately estimated. The accuracy of the roll bias may have a large effect on the ground cross track error, especially traversing pass to pass or traversing on the same control path but when vehicle 102 is driven in the opposite direction. To estimate the roll from the terrain, the terrain on the sides of vehicle 102 should already be mapped. One example simplified process for estimating the pitch bias is described below in FIG. 7.

Operation 140A can be modified so the GNSS positional measurements are parameterized into a 1-dimensional height profile along the direction of travel. This reduction allows the pitch bias to be identified in a more computational efficient way without the need of mapping the terrain height profile in 2-dimensions.

Let the height profile be a function such that:

$$h_i = h(d_i)$$

where $h_i$ is the height at displacement distance $d_i$ and $h(\cdot)$ the height profile function or set. To convert GNSS positional measurements $P_k^n$ into this parameterized form, the following mapping may be used. The displacement between GNSS samples is calculated using:

$$\Delta d_k = \alpha \sqrt{(P_{x_k}^n - P_{x_{k-1}}^n)^2 + (P_{y_k}^n - P_{y_{k-1}}^n)^2},$$

where $\Delta d_k$ is the change in the parameterized distance for GNSS measurement k, $(P_x, P_y)_k^n$ are the x and y positional components for GNSS measurement k, are the x $(P_x, P_y)_{k-1}^n$ and y positional components for the previous GNSS measurement k−1, and α is a direction scaling factor that is α=1 if traveling forward (V>0) or α=−1 if traveling in reverse (V<0).

The current displacement distance $d_k$ is obtained by accumulating all the displacement differences for the previous measurements.

$$d_k = \sum_k \Delta d_k.$$

The change distance $\Delta d_k$ is approximated from the velocity for a smooth profile, such that:

$$\Delta d_k = (t_k - t_{k-1})V,$$

where $t_k$ is the time of the current GNSS measurement, $t_{k-1}$ is the time of the previous GNSS measurement, and V is the signed forward speed of the vehicle. The altitude measurement $h_k$ is taken from the z component of the GNSS positional measurement $P_k^n$, which is paired with the displacement to form the height profile data point $(d_k, h_k)$.

The slope of terrain 116 around the current vehicle position may be estimated from this dataset. Control unit 118 may fit a mathematical feature, such as a first order polynomial, to the data set and the first derivative evaluated around the current point of interest (current location 114 of vehicle 102).

A discrete implementation of this evaluates:

$$S_x = \sum_{i=k-n}^{n} d_i$$

$$S_{xx} = \sum_{i=k-n}^{n} d_i^2$$

$$S_y = \sum_{i=k-n}^{n} h_i$$

$$S_{xy} = \sum_{i=k-n}^{n} d_i h_i$$

where n is the smallest number (to keep the region of interest around the local position) which satisfies n>2 and n>w, where w is the wheel base of vehicle 102 to help account for the length of the vehicle.

Control unit 118 may extract the slope and hence ground pitch $\theta_g$ from the least squares straight line fit using:

$$\theta_g = \arctan\left(\frac{S_{xy} - \frac{1}{n}S_x S_y}{S_{xx} - \frac{1}{n}S_x^2}\right)$$

$$\theta_g = \arctan\left(\frac{S_{xy} - \frac{1}{n}S_x S_y}{S_{xx} - \frac{1}{n}S_x^2}\right).$$

Operation 140B is unmodified from before, however it is only the pitch attitude that is considered rather than both the roll and pitch.

Control unit 118 in operation 140C may monitor a time history of the difference between the ground pitch $\theta_g$ and inertial sensor pitch $\theta_h$ (or vehicle pitch $\theta = \theta_h - \theta_b$). Control unit 118 may filter this difference to estimate the mean and when there is a detectable change in mean, adjust the pitch bias to the identified value.

If the difference between ground and inertial pitch is monitored $\gamma = \theta_h - \theta_g$, then when the low pass filtered value $\bar{\gamma}$ is significantly different from the current pitch bias estimate $|\bar{\gamma} - \theta_b| > t_\theta$ where $t_\theta$ is a detection threshold, control unit 118 may update the pitch bias $\theta_b = \bar{\gamma}$.

Control unit 118 may monitor the difference between the ground and vehicle pitch, $\gamma = \theta - \theta_g$ where $\theta = \theta_h - \theta_b$. When the low pass filtered value $\bar{\gamma}$ is significantly different from zero $|\bar{\gamma}| > 0$, control unit 118 may shift the pitch bias $\hat{\theta}_b = \theta_b + \bar{\gamma}$ where $\hat{\theta}_b$ is the new updated pitch bias.

Figure 6:
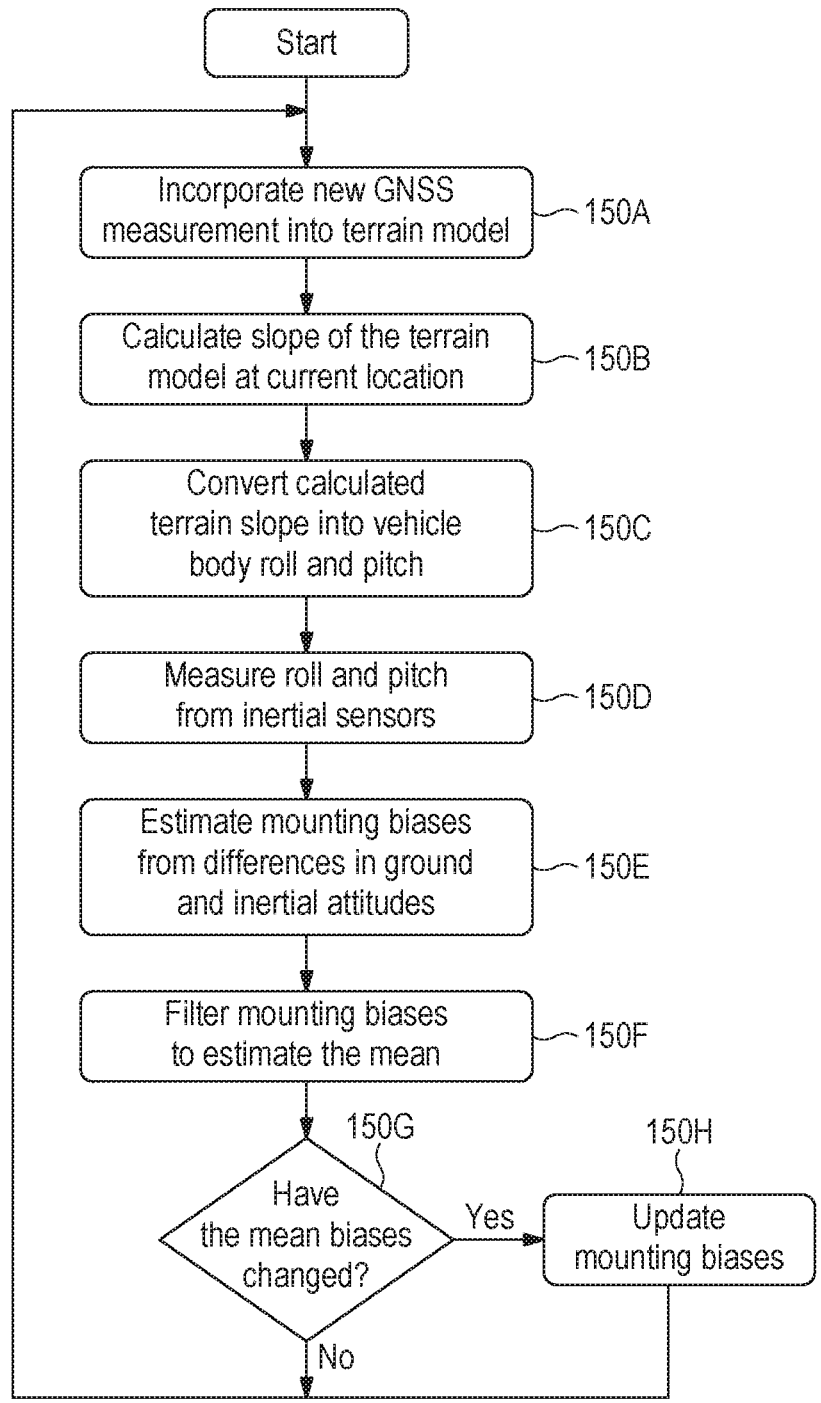
FIG. 6 depicts an example process for estimating an inertial sensor mounting bias based on terrain slope from a terrain map.

FIG. 6 summarizes one example algorithm control unit 118 executes for estimating a terrain map around vehicle 102 and then extracting the estimated roll and pitch slope angles of ground surface 116 from the terrain map.

In operation 150A, control unit 118 incorporates new GNSS measurements into a terrain model. As explained above, the terrain model is alternatively referred to as a terrain map or terrain profile and may be data stored in computer memory that identifies GNSS measured altitudes for associated longitude and latitude positions. In operation 150B, control unit 118 calculates a slope of the terrain model at a current location. As explained above, control unit 118 may calculate a changes in distance vs. a change in altitude from a previously measured location to calculate the slope.

In operation 150C, control unit 118 converts the calculated terrain slope into a vehicle body roll and pitch. For example, control unit 118 calculates the partial derivative of the height map to convert the terrain slope into the vehicle roll and pitch angles. In operation 150D, control unit 118 measures the roll and pitch from the internal sensor subsystem 108. For example, control unit 118 reads the roll and pitch attitude measurements from inertial sensor subsystem 108.

In operation 150E, control unit 118 estimates the mounting biases of inertial sensor subsystem 108. For example, control unit 118 calculates the differences of the calculated terrain/vehicle roll and pitch compared with the measured roll and pitch from inertial sensor subsystem 108 to determine the mounting biases between inertial sensor subsystem 108 and vehicle 102.

In operation 150F, control unit 118 may filter the calculated mounting biases to estimate a mean mounting bias. Any filtering method that smoothes the time history while maintaining the relevant mean profile may be used. A simple first order low pass filter can be implemented $\bar{\gamma}_i = \alpha \gamma_i + (1-\alpha) \bar{\gamma}_{i-1}$ such that the mean bias can be calculated using where $\alpha$ is the smoothing factor, $\bar{\gamma}$ is the filtered value, $\gamma$ is the raw value with subscript i being the sample index. In operation 150G, control unit 118 determines if the mean bias has changed more than some threshold amount. In operation 150H, control unit 118 may update a current mounting bias when the low pass filtered value is significantly different from zero. For example, control unit 118 may shift the mounting bias by the new mean bias value.

Figure 7:
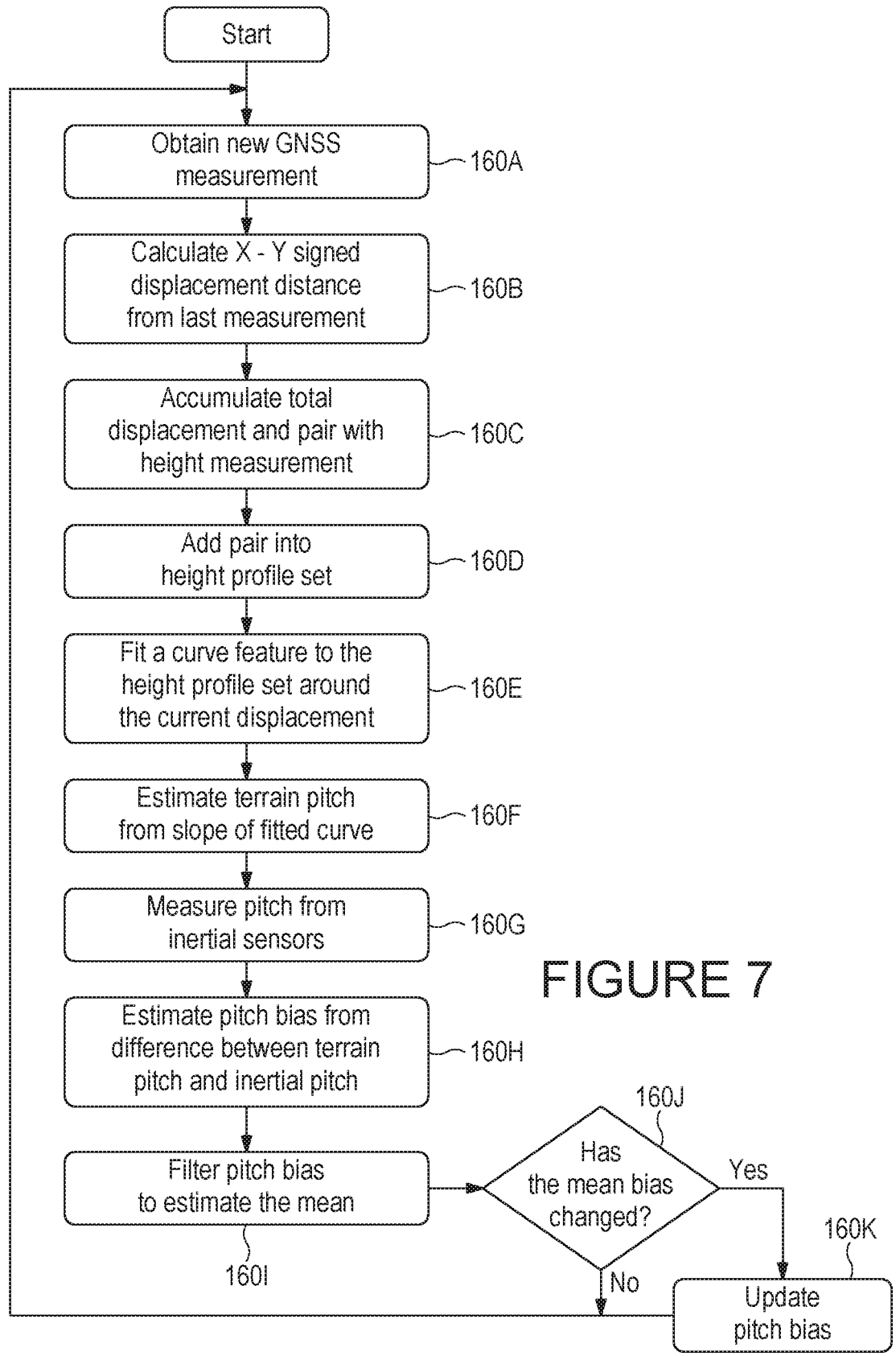
FIG. 7 depicts an example process for estimating pitch bias based on an estimated terrain pitch.

FIG. 7 summarizes another example of how control unit 118 uses another simplified, direct and robust technique for estimating the pitch bias of inertial sensor subsystem 108. In operation 160A, control unit 118 calculates an X-Y signed displacement distance from a last measurement as shown above.

In operation 160C, control unit 118 accumulates a total displacement from the previous measurement point and pairs the accumulated total distance with a current height measurement. In operation 160D, control unit 118 adds the distance-height pair into a height profile set as shown above in FIG. 4.

In operation 160E, control unit 118 uses a fit curve feature at a current displacement position in the height profile as discussed above. In operation 160F, control unit 118 estimates the terrain pitch from the slope of the fitted curve. In operation 160G, control unit measures the vehicle pitch from inertial sensor subsystem 108. In operation 160H, control unit 118 estimates the pitch bias as the difference between the calculated terrain pitch and the measured inertial sensor subsystem pitch.

In operation 160I, control unit 118 filters the calculated pitch bias to estimate a mean pitch bias. If the mean pitch bias has changed by some threshold amount in operation 160J, control unit 118 in operation 160K updates the pitch bias to the latest calculated mean pitch bias.

Computer, Software, and Sensor Systems

A Global navigation satellite system (GNSS) is broadly defined to include GPS (U.S.) Galileo (European Union, proposed) GLONASS (Russia), Beidou (China) Compass (China, proposed) IRNSS (India, proposed), QZSS (Japan, proposed) and other current and future positioning technology using signal from satellites, with or with augmentation from terrestrial sources.

IMUs may include gyroscopic (gyro) sensors, accelerometers and similar technologies for providing outputs corresponding to the inertial of moving components in all axes, i.e., through six degrees of freedom (positive and negative directions along transverse X, longitudinal Y and vertical Z axes). Yaw, pitch and roll refer to moving component rotation about the Z, X, and Y axes respectively. Said terminology will include the words specifically mentioned, derivative thereof and words of similar meaning.

Figure 8:
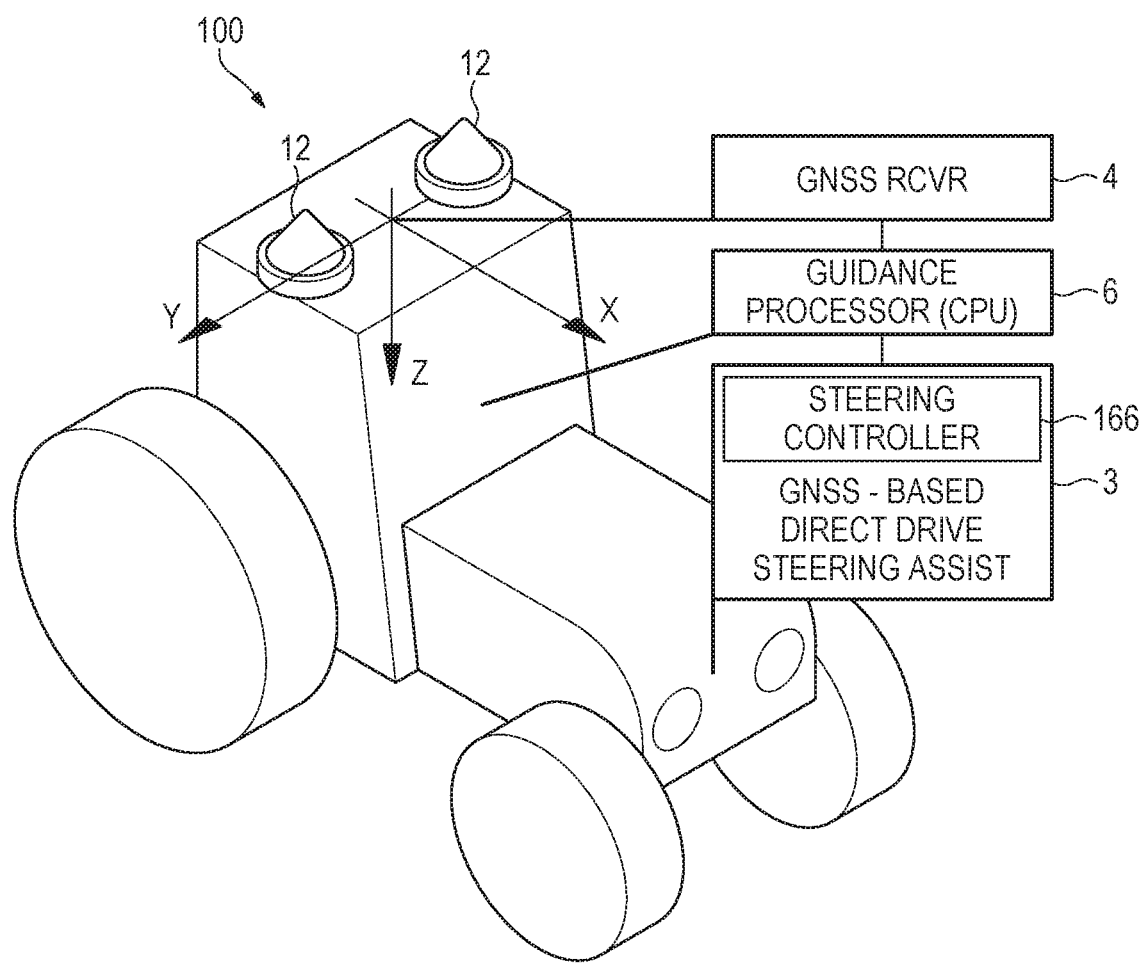
FIG. 8 shows details of an auto-steering system.

FIG. 8 generally shows auto-steering system 100 used in conjunction with an electrical direct-drive steering assistance mechanism 3. Without limitation on the generality of useful applications of auto-steering system 100, a GNSS receiver 4, and a guidance processor 6 are connected to a GNSS antenna 12 and installed into vehicle 102, such as an agricultural vehicle or tractor. A steering controller 166 is electrically connected to guidance processor 6, and is mechanically interfaced with vehicle 102 via steering assistance mechanism 3.

Figure 9:
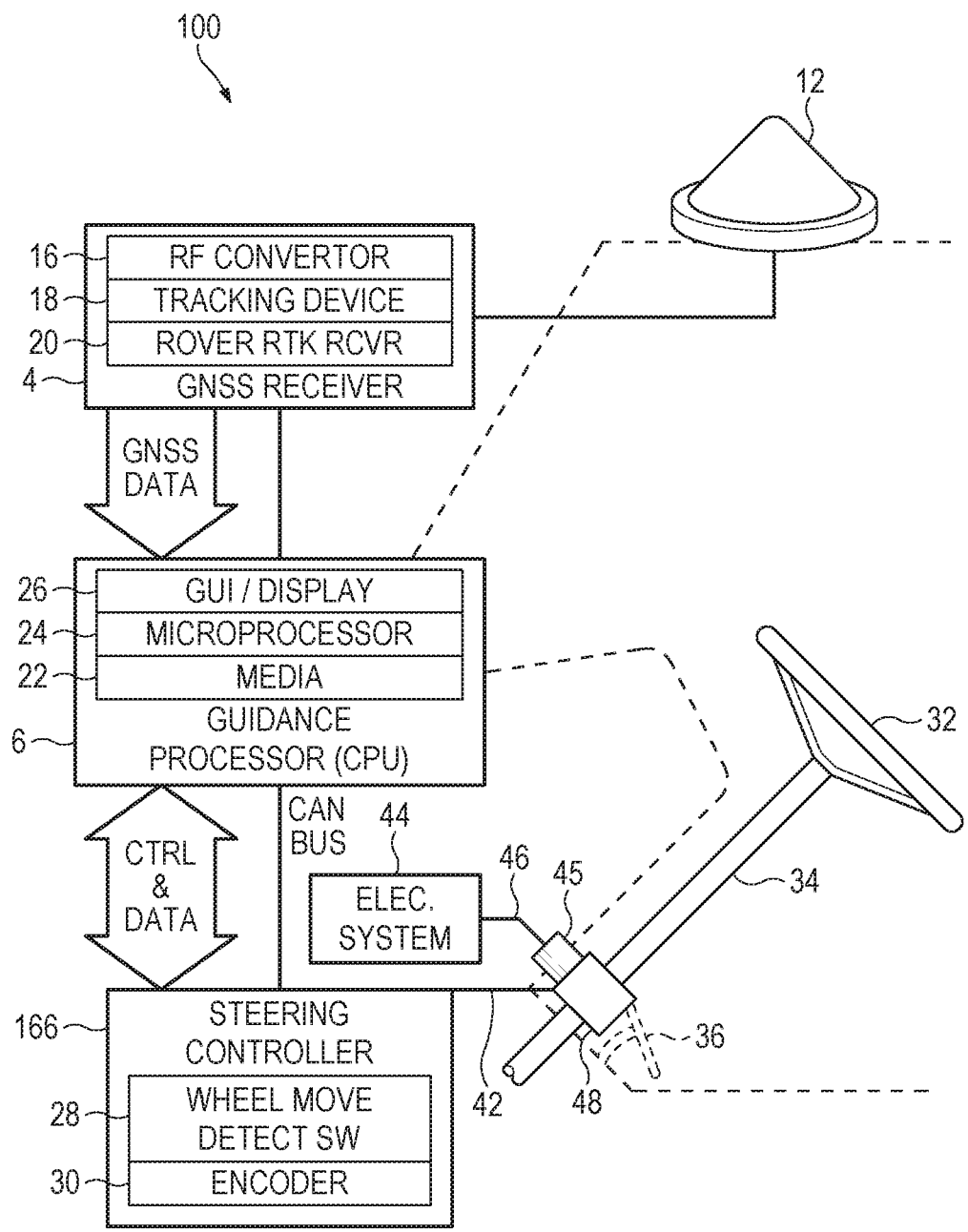
FIG. 9 shows the auto-steering system of FIG. 8 in more detail.
Figure 10:
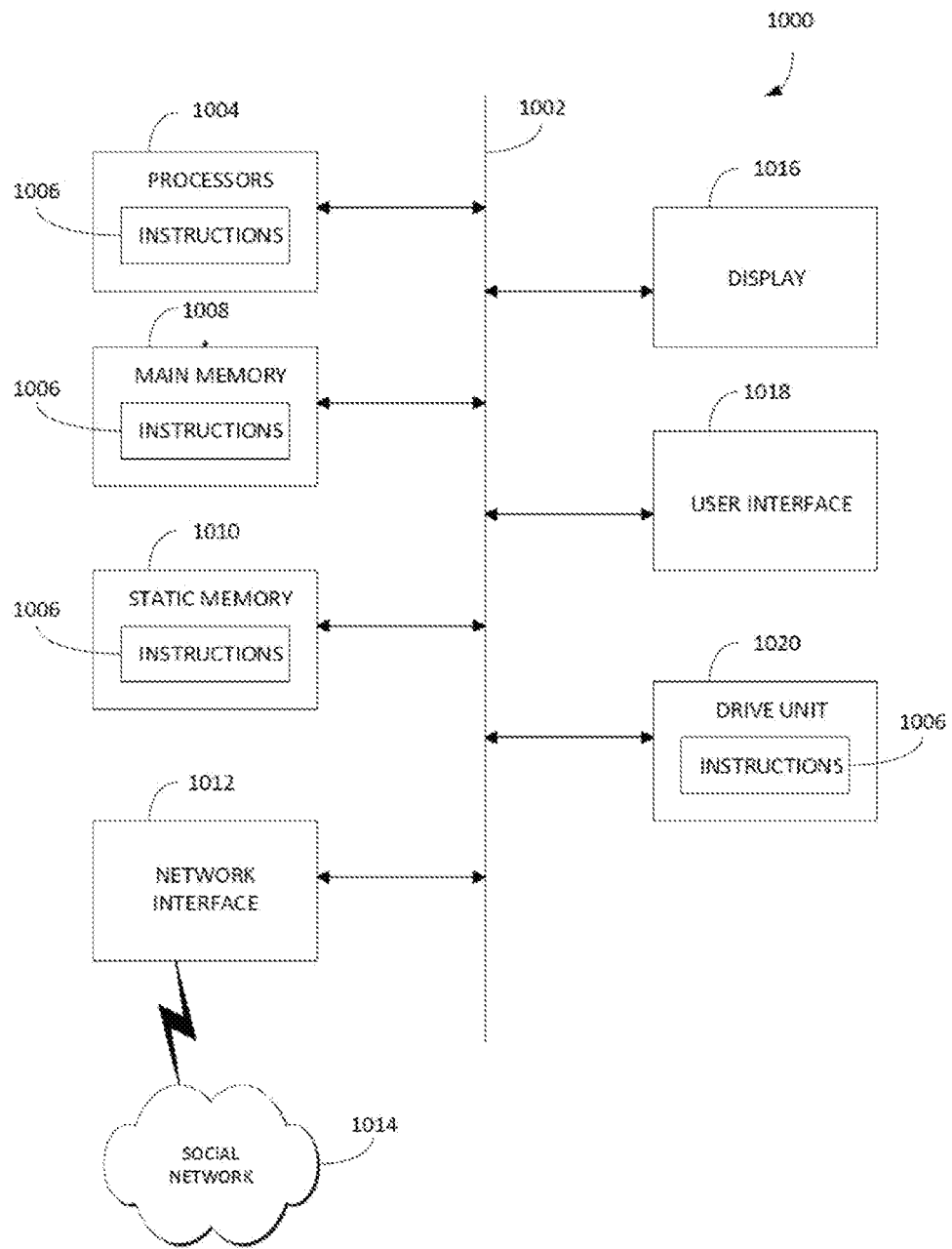
FIG. 10 shows an example computer system that can be used as part of the control unit that automatically calculates inertial sensor attitude offsets.

FIG. 9 shows additional detail of auto-steering system 100. The GNSS receiver 4 is further comprised of an RF convertor (i.e., downconvertor) 16, a tracking device 18, and a rover RTK receiver element 20. GNSS receiver 4 electrically communicates with, and provides GNSS positioning data to, guidance processor 6. In one example, guidance processor 6 may operate as control unit 118 described above.

Guidance processor 6 includes a graphical user interface (GUI) 26, a microprocessor 24, and a media element 22, such as a memory storage drive. Guidance processor 6 electrically communicates with, and provides control data to steering controller 166. Steering controller 166 includes a wheel movement detection switch 28 and an encoder 30 for interpreting guidance and steering commands from CPU 6.

Steering controller 166 may interface mechanically with the vehicle's steering column 34, which is mechanically attached to steering wheel 32. A control line 42 may transmit guidance data from CPU 6 to steering controller 166. An electrical subsystem 44, which powers the electrical needs of vehicle 102, may interface directly with steering controller 166 through a power cable 46. Steering controller 166 can be mounted to steering column 34 near the floor of the vehicle, and in proximity to the vehicle's control pedals 36. Alternatively, steering controller 166 can be mounted at other locations along steering column 34.

As explained above, some auto-steering systems 100 may include an inertial sensor subsystem 108 that attaches to steering column 34. Of course, inertial sensor subsystem 108 may be attached to any location in vehicle 102.

Steering controller 166 physically drives and steers vehicle 102 by actively turning the steering wheel 32 via steering column 34. A motor 45 powered by vehicle electrical subsystem 44 may power a worm drive which powers a worm gear 48 affixed to steering controller 166. These components are preferably enclosed in an enclosure. In other embodiments, steering controller 166 is integrated directly into the vehicle drive control system independently of steering column 34.

Example Computing System

The diagram below shows a computing device 1000 used for operating the control unit 118 that includes guidance processor 6 discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD), light emitting diode (LED), organic light emitting diode (OLED), or a cathode ray tube (CRT) and a user interface 1018, such as a keyboard, mouse, touch screen, etc. All of the components of computing device 1000 may be connected together via a bus 1002 and/or network.

The system described above can use dedicated processor systems, micro controllers, programmable logic devices, or microprocessors that perform some or all of the operations. Some of the operations described above may be implemented in software, such as computer readable instructions contained on a storage media, or the same or other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

References above have been made in detail to preferred embodiment. Examples of the preferred embodiments were illustrated in the referenced drawings. While preferred embodiments where described, it should be understood that this is not intended to limit the invention to one preferred embodiment. To the contrary, it is intended to cover alternatives, modifications, and equivalents as may be included within the spirit and scope of the invention as defined by the appended claims.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A system for calibrating sensor readings for a vehicle having a plurality of sensor subsystems separately attached thereto, the system comprising:
 a hardware processor to:
  estimate an attitude of sloping terrain from a series of height and position measurements that are based on data collected from a first sensor subsystem of the plurality of separately-attached sensor subsystems;
  estimate an attitude of a second different sensor subsystem of the plurality of separately-attached sensor subsystems, wherein the second sensor subsystem includes an inertial sensor subsystem attached to the vehicle at a different location than the first sensor subsystem;
 wherein the first sensor subsystem includes a receiver of a global navigation satellite system (GNSS), wherein the hardware processor is further configured to:
  estimate the attitude of the sloping terrain from altitudes measured with the GNSS;

estimate the attitude of the inertial sensor subsystem with roll and pitch measurements from the inertial sensor subsystem;

calculate an attitude offset between the vehicle and the inertial sensor subsystem based on a difference between the estimated attitude of the sloping terrain and the estimated attitude of the inertial sensor subsystem; and generate steering commands using position data generated using the first sensor subsystem and attitude data generated using the inertial sensor subsystem and the calculated attitude offset, wherein the steering commands are arranged to control a steering control unit of the vehicle to auto-steer the vehicle.

2. The calibration system of claim 1, wherein the hardware processor is further configured to:

measure an altitude of the sloping terrain at a current location of the vehicle;

measure a distance from a previous location of the vehicle;

estimate a slope of the sloping terrain from the altitude and distance;

convert the slope of the sloping terrain into an estimated roll or pitch of the vehicle; and use the estimated roll or pitch of the vehicle as the attitude of the vehicle.

3. The calibration system of claim 1, wherein the hardware processor is further configured to:

calculate attitude offsets between the vehicle and inertial sensor subsystem for different positions of the vehicle;

estimate a mean for the attitude offsets;

identify changes in the mean; and update the attitude offset based on detected changes in the mean.

4. The calibration system of claim 1, wherein the hardware processor is further configured to calculate a pitch $\theta_g$ of the sloping terrain from the least squares straight line fit of a height profile, where:

$$\theta_g = \arctan\left(\frac{S_{xy} - \frac{1}{n}S_x S_y}{S_{xx} - \frac{1}{n}S_x^2}\right),$$

$$S_x = \sum_{i=k-n}^{n} d_i$$

$$S_{xx} = \sum_{i=k-n}^{n} d_i^2$$

$$S_y = \sum_{i=k-n}^{n} h_i$$

$$S_{xy} = \sum_{i=k-n}^{n} d_i h_i$$

n is a smallest number which satisfies n>2 and, n>w, w is a wheel base of the vehicle, $h_i$ is a measured height of the vehicle at displacement distance $d_i$, and k is a GNSS measurement.

5. The calibration system of claim 1, wherein the hardware processor is further configured to:

monitor a time history of differences between a pitch $\theta_g$ of the sloping terrain and a $\theta_h$ pitch from the inertial sensor subsystem;

estimate a mean difference between $\theta_g$ and $\theta_h$; and adjust a pitch bias of the inertial sensor subsystem based on a change in the mean difference.

6. The system of claim 1, wherein the second sensor subsystem is mounted onto a steering wheel or steering column of the vehicle, wherein the steering wheel or steering column has an adjustable rake angle, and wherein the first sensor subsystem is mounted on the vehicle remote from the steering wheel or steering column.

7. The calibration system of claim 1, wherein the hardware processor is further configured to:

determine altitudes and associated positions of the vehicle;

add the altitudes and associated positions to a height profile; and use the height profile to estimate the attitude of the sloping terrain.

8. The calibration system of claim 7, wherein the hardware processor is further configured to:

fit a curve to the height profile around a current position of the vehicle;

estimate a pitch of the sloping terrain from a slope of the fitted curve; and estimate a pitch bias of the inertial sensor subsystem based on a difference between the estimated pitch of the sloping terrain and a pitch measurement from the inertial sensor subsystem.

9. The calibration system of claim 1, wherein the hardware processor is further configured to:

generate a height map of the sloping terrain by measuring altitudes at different geographic locations;

calculate a partial derivative of the height map to generate roll and pitch angles; and calculate the attitude of the sloping terrain from the roll and pitch angles.

10. The calibration system of claim 9, wherein the hardware processor is further configured to:

calculate roll $\phi_g$ and pitch $\theta_g$ angles of the sloping terrain using:

$$\phi_g = \arctan\left(\cos(\psi)\left(\frac{\partial h^n}{\partial x}\right) + \sin(\psi)\left(\frac{\partial h^n}{\partial y}\right)\right)$$

$$\theta_g = \arctan\left(-\sin(\psi)\left(\frac{\partial h^n}{\partial x}\right) + \cos(\psi)\left(\frac{\partial h^n}{\partial y}\right)\right)$$

where $h_i$ is the height at the position coordinates $(x_i, y_i)$ and $h(\bullet, \bullet)$ of a terrain model, and $$\left(\frac{\partial h^n}{\partial x}, \frac{\partial h^n}{\partial y}\right)$$

are the partial derivatives of a height map estimated around a current vehicle location and $\psi$ is the vehicle body heading.

11. A memory storing a computer program for estimating a calibration bias for an inertial sensor in a vehicle having a plurality of sensor separately attached thereto, wherein the inertial sensor comprises a first sensor of the plurality of separately-attached sensors, the computer program comprising a set of instructions operable to:

estimate an axis of the vehicle from a series of height and position measurements that are based on data supplied from a second sensor of the plurality of separately-attached sensors, wherein the second sensor is attached to the vehicle at a different location than the first sensor;

wherein the second sensor includes a receiver of a global navigation satellite system (GNSS), and wherein the instructions are further operable to:

estimate the axis of the vehicle from altitudes measured with the GNSS;

estimate the axis of the inertial sensor from roll and pitch readings from the inertial sensor;

calculate an offset between the axis of the vehicle and the axis of the inertial sensor; and calibrate the inertial sensor based on the offset.

12. The memory of claim 11, wherein the instructions are further operable to estimate the axis of the sloping terrain from a terrain map.

13. The memory of claim 11, wherein:

the axis of the vehicle includes at one of a roll, pitch, or yaw angle of the vehicle; and the axis of the inertial sensor includes at least one of a roll, pitch, or yaw angle of the inertial sensor.

14. The memory of claim 11, wherein the instructions are further operable to:

measure an altitude;

calculate a slope from the altitude and a distance from a previous measurement;

convert the slope into at least one of an estimated roll or pitch of the vehicle; and use the at least one estimated roll or pitch of the vehicle as the axis of the vehicle.

15. The memory of claim 11, wherein the instructions are further operable to:

calculate offsets between the axis of the vehicle and the axis of the inertial sensor for different positions of the vehicle;

estimate a mean for the offsets; and update the calibrated offset of the inertial sensor based on a change in the mean.

16. The memory of claim 11, wherein a mounting location on which the first sensor is attached to the vehicle is movable with respect to a chassis or body of the vehicle, and wherein a mounting location on which the second sensor is attached is non-movable with respect to the chassis of the body of the vehicle.

17. The memory of claim 11, wherein the instructions are further operable to:

receive a current altitude measurement for a current position of the vehicle;

calculate a displacement distance from a previous position of the vehicle;

add the displacement distance and current altitude measurement to a height profile; and use the height profile to calculate the axis of the vehicle.

18. The memory of claim 17, wherein the instructions are further operable to:

fit a curve to the height profile around the current position of the vehicle;

estimate a pitch of the sloping terrain from a slope of the fitted curve; and estimate a pitch bias of the inertial sensor based on a difference between the estimated pitch of the sloping terrain and a pitch measurement from the inertial sensor.

* * * * *